United States Patent [19]
Caiozza

[11] Patent Number: 6,159,367
[45] Date of Patent: Dec. 12, 2000

[54] TELESCOPIC HOUSING FOR A MAGNET ARRAY

[76] Inventor: Joseph Caiozza, 321 W. Market St., Long Beach, N.Y. 11561

[21] Appl. No.: 09/299,499

[22] Filed: Apr. 26, 1999

[51] Int. Cl.[7] .................................................. B01D 35/06
[52] U.S. Cl. ........................ 210/222; 210/223; 184/6.25; 335/306
[58] Field of Search .................................. 210/222, 223, 210/695; 123/536, 538; 335/303, 306; 209/223.1; 96/1; 184/6.25

[56] References Cited

U.S. PATENT DOCUMENTS

| 4,572,145 | 2/1986 | Mitchell et al. | 123/538 |
| 5,030,344 | 7/1991 | Ambrose | 210/222 |
| 5,273,648 | 12/1993 | Caiozza | 210/222 |
| 5,510,024 | 4/1996 | Caiozza | 210/223 |

*Primary Examiner*—David A. Reifsnyder

[57] ABSTRACT

A telescopic housing is provided for a magnet array and includes a first telescopic housing member, a first strap reception member connected to the first telescopic housing member, a second telescopic housing member which receives the first telescopic housing member in a telescopic manner, and a second strap reception member connected to the second telescopic housing member. The first strap reception member and the second strap reception member include strap reception slots. Guide members are connected to the second telescopic housing member for guiding the first telescopic housing member in its connection with the second telescopic housing member. The first telescopic housing member includes first ventilation cowls extending out from the first telescopic housing member, and the second telescopic housing member includes second ventilation cowls extending out from the second telescopic housing member. The first telescopic housing member includes first ventilation slots, and the second telescopic housing member includes second ventilation slots which are aligned with the first ventilation slots, such that the first ventilation slots and the second ventilation slots together form ventilation windows. The telescopic housing is employed to attach a magnet array to an oil filter cartridge and is adjustable to accommodate a variety of magnet arrays.

5 Claims, 3 Drawing Sheets

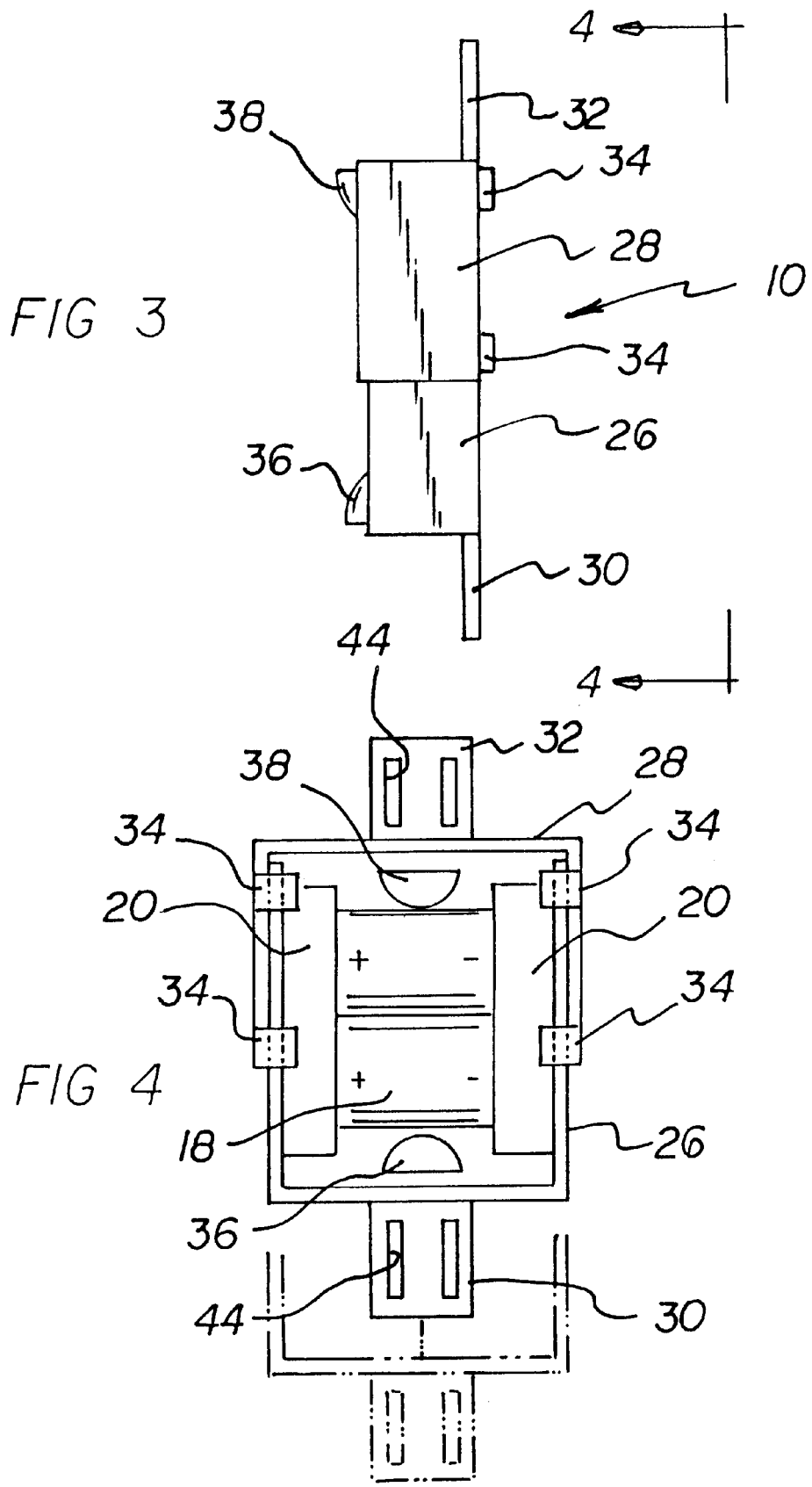

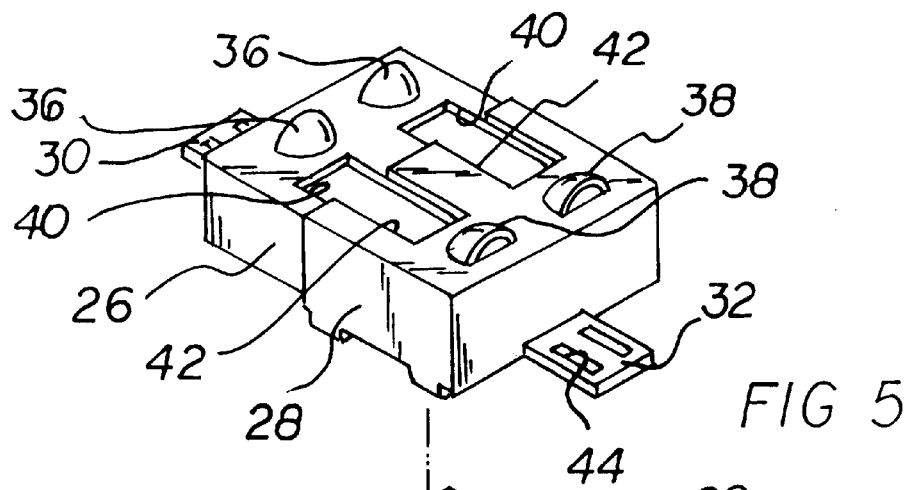
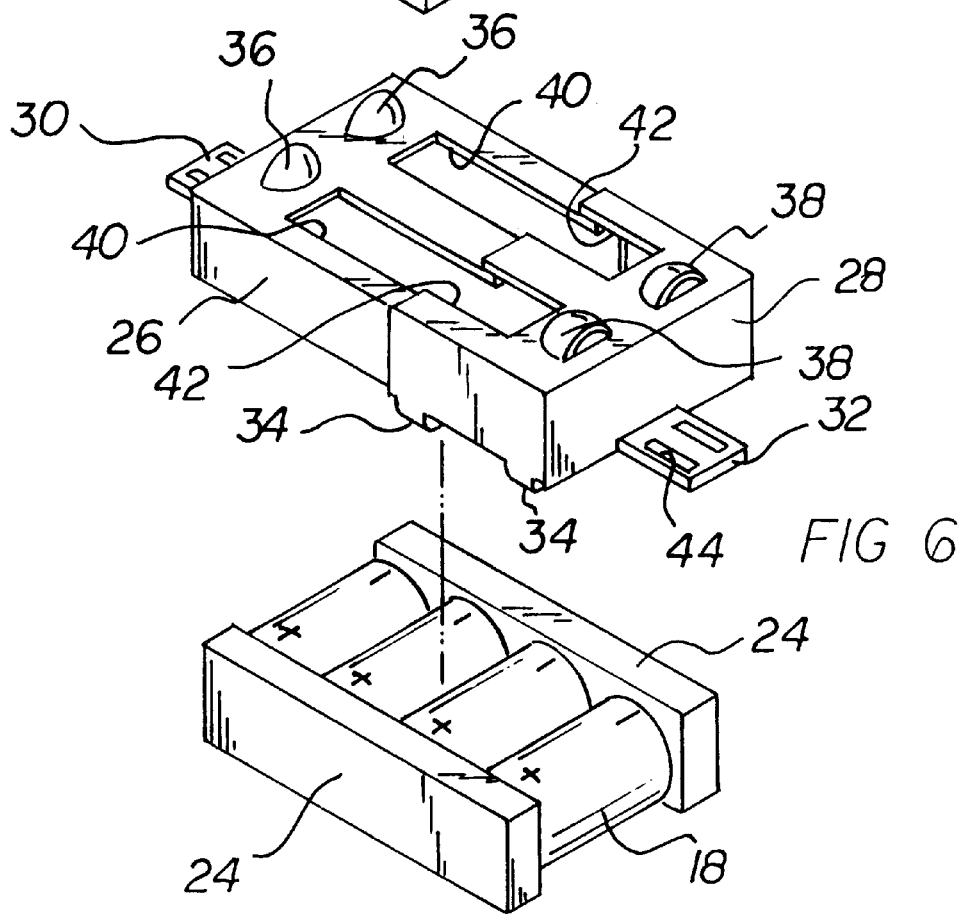

TELESCOPIC HOUSING FOR A MAGNET ARRAY

BACKGROUND OF THE INVENTION

1. Field of the Invention

The present invention relates generally to magnetic attachments to oil filter cartridges and, more particularly, to devices especially adapted for supporting a plurality of magnets on an oil filter cartridge.

2. Description of the Prior Art

For internal combustion engines, filtering engine oil to remove unwanted particles is an important function to extend engine life. The present inventor has previously invented devices for aiding in the trapping of metallic particles in oil filter cartridges based on the use of magnets attached to the outside of the oil filter cartridges. These previous magnet-based devices are set forth in U.S. Pat. No. 5,273,648 and in U.S. Pat. No. 5,510,024, both of which are incorporated herein by reference.

Not all oil filter cartridges are the same size. Although generally cylindrical in shape, oil filter cartridges vary in radii and vary in length along their cylindrical axes. Consequently, when a magnet array is placed collinear with the cylindrical axs of an oil filter cartridge, an oil filter cartridge having a longer cylindrical axis can afford to accommodate a magnet array having a longer length that is collinear with the longer cylindrical axis of the oil filter cartridge. Conversely, an oil filter cartridge having a shorter cylindrical axis can only afford to accommodate a magnet array having a shorter length that is collinear with the shorter cylindrical axis of the oil filter cartridge.

To attach a magnet array to an oil filter cartridge, a support bracket or housing is employed, and one or more straps or bands are used to attach the support bracket or housing to the oil filter cartridge. Rather than having a variety of different length support housings to accommodate a variety of different length magnet arrays for different length oil filter cartridges, instead, it would be desirable if a single housing for a magnet array could be provided that has an adjustable length that is collinear with the cylindrical axis of the oil filter cartridge.

To provide for a stable, secure connection between the support housing and the oil filter cartridge, it would be desirable if the support housing receives a pair of attachment straps for attaching the support housing to the oil filter cartridge.

When an engine reaches operating temperature, large amounts of heat must be removed from the engine. The oil filter cartridge is also hot, and a magnet array that is attached to the oil filter cartridge also becomes hot. In this respect, it would be desirable if a support housing for the magnet array had means for ventilating the magnet array to remove some heat from the magnet array.

Thus, although it is well known to use magnet arrays for attaching to oil filter cartridges, this art does not teach or suggest a telescopic housing for a magnet array which has the following combination of desirable features: (1) provides a single housing for a magnet array that has an adjustable length that is collinear with the cylindrical axis of the oil filter cartridge; (2) receives a pair of attachment straps for attaching the support housing to the oil filter cartridge; and (3) provides a support housing for the magnet array which includes means for ventilating the magnet array to remove some heat from the magnet array. The foregoing desired characteristics are provided by the unique telescopic housing for a magnet array of the present invention as will be made apparent from the following description thereof. Other advantages of the present invention over the prior art also will be rendered evident.

SUMMARY OF THE INVENTION

To achieve the foregoing and other advantages, the present invention, briefly described, provides a telescopic housing for a magnet array, wherein the telescopic housing includes a first telescopic housing member, a first strap reception member connected to the first telescopic housing member, a second telescopic housing member which receives the first telescopic housing member in a telescopic manner, and a second strap reception member connected to the second telescopic housing member. The first strap reception member and the second strap reception member include strap reception slots. Guide members are connected to the second telescopic housing member for guiding the first telescopic housing member in its connection with the second telescopic housing member.

The first telescopic housing member includes first ventilation cowls extending out from the first telescopic housing member, and the second telescopic housing member includes second ventilation cowls extending out from the second telescopic housing member. The first telescopic housing member includes first ventilation slots, and the second telescopic housing member includes second ventilation slots which are aligned with the first ventilation slots, such that the first ventilation slots and the second ventilation slots together form ventilation windows. The telescopic housing of the invention is employed to attach a magnet array to an oil filter cartridge and is adjustable to accommodate a variety of magnet arrays.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved telescopic housing for a magnet array which has all of the advantages of the prior art and none of the disadvantages.

It is another object of the present invention to provide a new and improved telescopic housing for a magnet array which may be easily and efficiently manufactured and marketed.

It is a further object of the present invention to provide a new and improved telescopic housing for a magnet array which is of durable and reliable construction.

An even further object of the present invention is to provide a new and improved telescopic housing for a magnet array which is susceptible of a low cost of manufacture with regard to both materials and labor, and which accordingly is then susceptible of low prices of sale to the consuming public, thereby making such telescopic housing for a magnet array available to the buying public.

Still yet a further object of the present invention is to provide a new and improved telescopic housing for a magnet array which provides a single housing for a magnet array that has an adjustable length that is collinear with the cylindrical axis of the oil filter cartridge.

Still another object of the present invention is to provide a new and improved telescopic housing for a magnet array that receives a pair of attachment straps for attaching the support housing to the oil filter cartridge.

Yet another object of the present invention is to provide a new and improved telescopic housing for a magnet array which provides a support housing for the magnet array which includes means for ventilating the magnet array to remove some heat from the magnet array.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a side view of the embodiment of the invention shown in FIG. 2 taken along line 3—3 thereof.

FIG. 4 is a bottom view of the embodiment of the invention shown in FIG. 3 taken along line 4—4 thereof.

FIG. 5 is an exploded perspective view of the embodiment of the invention shown in FIGS. 1–4 with the magnet array removed from the support housing.

FIG. 6 is an exploded perspective view of the embodiment of the invention shown in FIGS. 1–5 with the support housing is an extended orientation to accommodate a second magnet array that is longer than the magnet array shown in FIGS. 1–5.

DESCRIPTION OF THE PREFERRED EMBODIMENT

Figure 1:
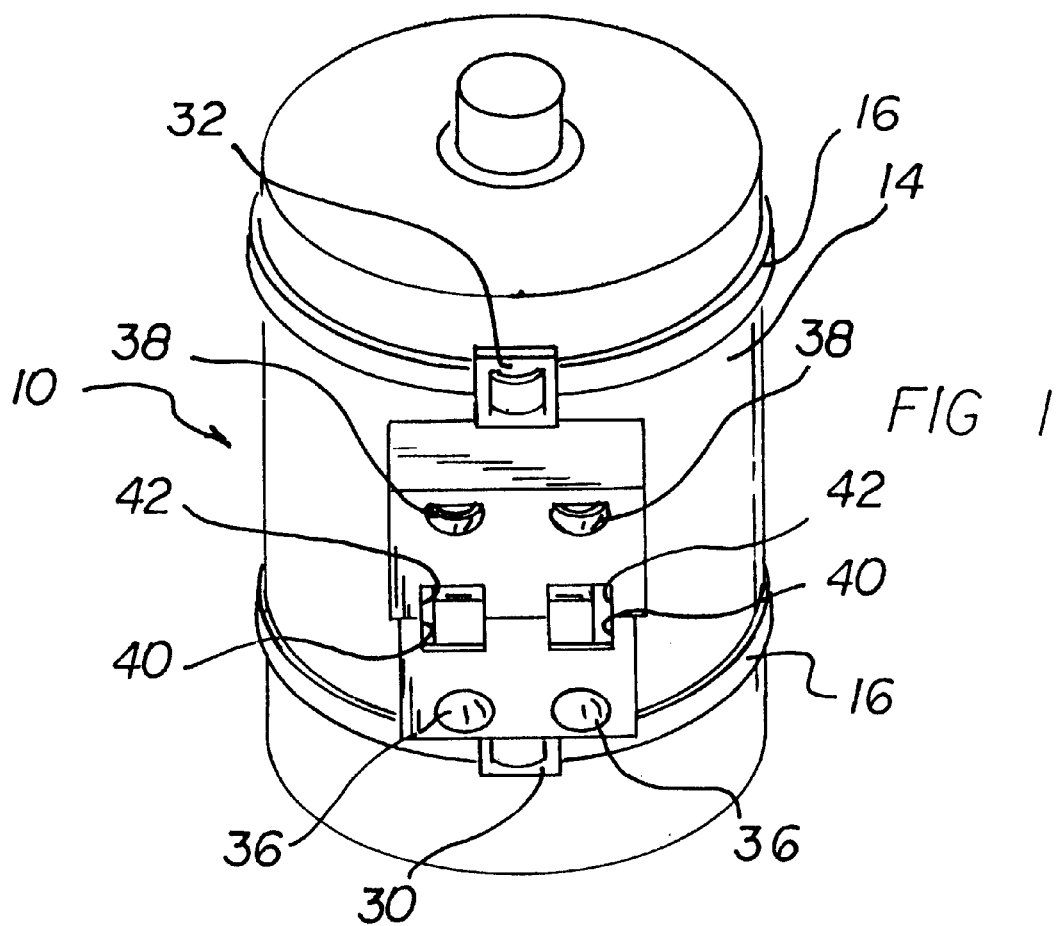
FIG. 1 is a perspective view showing a preferred embodiment of the telescopic housing for a magnet array of the invention which is housing a magnet array and which is attached to an oil filter cartridge with a pair of attachment straps.
Figure 2:
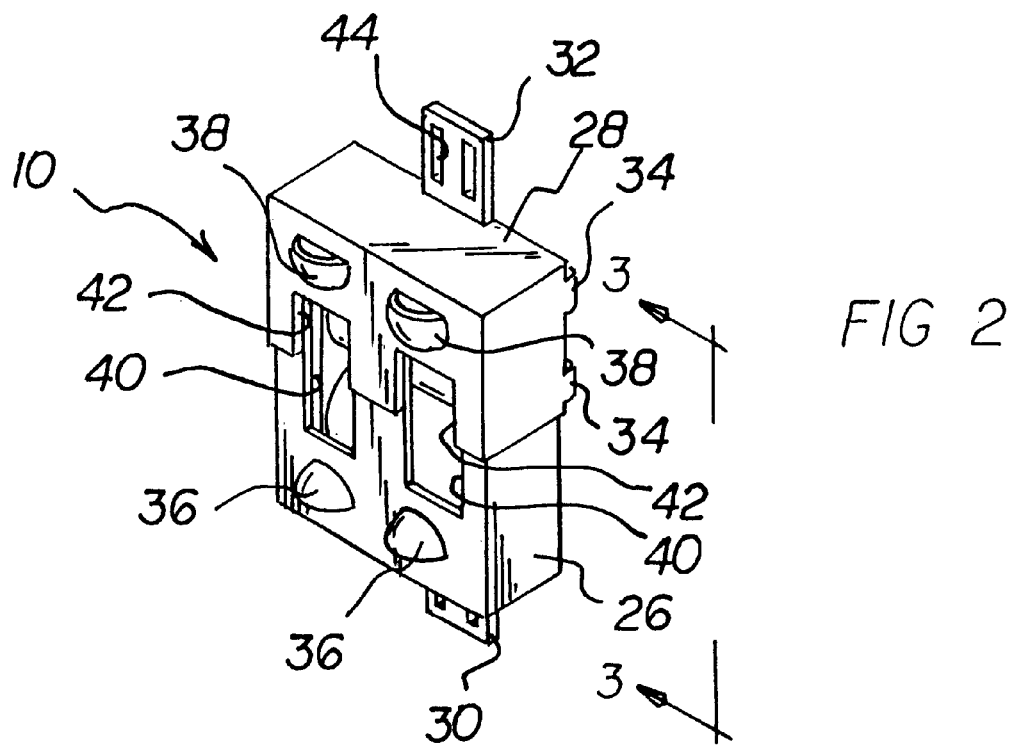
FIG. 2 is a perspective view of the embodiment of the invention shown in FIG. 1 separated from the oil filter cartridge and not having attachment straps connected thereto.

With reference to the drawings, a new and improved telescopic housing for a magnet array embodying the principles and concepts of the present invention will be described.

Turning to FIGS. 1–6, there is shown an exemplary embodiment of the telescopic housing for a magnet array of the invention generally designated by reference numeral 10. In its preferred form, telescopic housing 10 is provided for a magnet array and includes a first telescopic housing member 26, a first strap reception member 30 connected to the first telescopic housing member 26, a second telescopic housing member 28 which receives the first telescopic housing member 26 in a telescopic manner, and a second strap reception member 32 connected to the second telescopic housing member 28. The first strap reception member 30 and the second strap reception member 32 include strap reception slots 44. Guide members 34 are connected to the second telescopic housing member 28 for guiding the first telescopic housing member 26 in its connection with the second telescopic housing member 28.

The first telescopic housing member 26 includes first ventilation cowls 36 extending out from the first telescopic housing member 26, and the second telescopic housing member 28 includes second ventilation cowls 38 extending out from the second telescopic housing member 28. The first telescopic housing member 26 includes first ventilation slots 40, and the second telescopic housing member 28 includes second ventilation slots 42 which are aligned with the first ventilation slots 40, such that the first ventilation slots 40 and the second ventilation slots 42 together form ventilation windows.

To use the telescopic housing 10 of the invention, a magnet array is obtained. As shown in FIG. 5, a magnet array includes two cylindrical magnets 18 and a pair of end pieces 20 for connecting the cylindrical magnets 18 together. That is, magnetic force between the cylindrical magnets 18 and the end pieces 20 bonds the entire assembly into the magnet array. As shown in FIG. 4, to form the magnet array, cylindrical magnets 18 are placed side by side so that respective north poles of adjacent magnets are adjacent to one another and so that respective south poles of adjacent magnets are adjacent to one another.

Once the magnet array is obtained, the second telescopic housing member 28 is placed bottom side up, and the magnet array is inserted into the second telescopic housing member 28. Then, the first telescopic housing member 26 is slid into the second telescopic housing member 28 in telescopic fashion as shown in FIG. 4. An extended position of the first telescopic housing member 26 is shown in FIG. 4 in broken lines. The contracted orientation of the first telescopic housing member 26 with respect to the second telescopic housing member 28 is shown in solid lines in FIG. 4. As the first telescopic housing member 26 is slid into the second telescopic housing member 28, the guide members 34 guide the first telescopic housing member 26.

After the magnet array has been installed in the telescopic housing 10, the telescopic housing 10 is installed on the oil filter cartridge 14 as shown in FIG. 1. More specifically, a pair of attachment straps 16 are threaded through the strap reception slots 44 in the respective first strap reception member 30 and second strap reception member 32. The straps are tightened in a conventional way (not shown) so that the attachment straps 16 firmly bind the telescopic housing 10 to the oil filter cartridge 14.

As shown in FIG. 6, the telescopic housing 10 can be easily adjusted to accommodate a larger magnet array than shown in FIGS. 1–5. More specifically, the magnet array in FIG. 6 contains four cylindrical magnets 18, and the end pieces 24 are sufficiently long to accommodate the four cylindrical magnets 18. Once the longer magnet array is placed in the telescopic housing 10 as described Gabove the two magnet array, the longer magnet array is attached to the oil filter cartridge 14 in the same manner as descnrbed above.

Some of the heat that is transferred from the hot oil filter cartridge 14 is somewhat dissipated by the first ventilation cowls 36 and the second ventilation cowls 38. In addition, further ventilation is achieve by air circulating through the ventilation windows formed by the first ventilation slots 40 and the second ventilation slots 42.

The components of the telescopic housing for a magnet array of the invention can be made from inexpensive and durable metal and heat resistant plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved telescopic housing for a magnet array that is low in cost, relatively simple in design and operation, and which advantageously provides a single housing for a magnet array that has an adjustable length that is collinear with the cylindrical axis of the oil filter cartridge. With the invention, a telescopic housing for a magnet array is provided which receives a pair of attachment straps for attaching the support housing to the oil filter cartridge. With the invention, a telescopic housing for a magnet array provides a support housing for the magnet array which includes means for ventilating the magnet array to remove some heat from the magnet array.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A telescopic housing for a magnet array, comprising:

a first telescopic housing member, a first strap reception member connected to said first telescopic housing member, a second telescopic housing member which receives said first telescopic housing member in a telescopic manner such that said first and said second telescopic housing members are adapted to be telescopically displaced relative to each other to vary the interior volume defined by said first and second telescopic housing members, and a second strap reception member connected to said second telescopic housing members, said first telescopic housing member includes first ventilation slots, and said second telescopic housing member includes second ventilation slots which are aligned with said first ventilation slots, such that said first ventilation slots and said second ventilation slots together form ventilation windows which are adapted to vary in size when said first and second housing members are telescopically displaced relative to each other.

2. The housing of claim 1 wherein said first strap reception member and said second strap reception member include strap reception slots.

3. The housing of claim 1, further including:

guide members connected to said second telescopic housing member for guiding said first telescopic housing member in its connection with said second telescopic housing member.

4. The housing of claim 1 wherein said first telescopic housing member includes first ventilation cowls extending out from said first telescopic housing member.

5. The housing of claim 1 wherein said second telescopic housing member includes second ventilation cowls extending out from said second telescopic housing member.

* * * * *